(12) United States Patent
Swager et al.

(10) Patent No.: US 11,109,619 B2
(45) Date of Patent: Sep. 7, 2021

(54) FILTER MATERIALS INCLUDING FUNCTIONALIZED CELLULOSE

(71) Applicant: Massachusetts Institute of Technology, Cambridge, MA (US)

(72) Inventors: Timothy M. Swager, Newton, MA (US); Jisun Im, Busan (KR)

(73) Assignee: Massachusetts Institute of Technology, Cambridge, MA (US)

( * ) Notice: Subject to any disclaimer, the term of this patent is extended or adjusted under 35 U.S.C. 154(b) by 145 days.

(21) Appl. No.: 14/915,923

(22) PCT Filed: Sep. 5, 2014

(86) PCT No.: PCT/US2014/054391
§ 371 (c)(1),
(2) Date: Mar. 2, 2016

(87) PCT Pub. No.: WO2015/035236
PCT Pub. Date: Mar. 12, 2015

(65) Prior Publication Data
US 2016/0192701 A1   Jul. 7, 2016

Related U.S. Application Data

(60) Provisional application No. 61/874,615, filed on Sep. 6, 2013.

(51) Int. Cl.
*A24D 3/10* (2006.01)
*B01J 20/28* (2006.01)
(Continued)

(52) U.S. Cl.
CPC ............ *A24D 3/10* (2013.01); *A24D 3/067* (2013.01); *A24D 3/14* (2013.01); *A24D 3/163* (2013.01);
(Continued)

(58) Field of Classification Search
None
See application file for complete search history.

(56) References Cited

U.S. PATENT DOCUMENTS 6,119,699 A   9/2000 Sung
6,171,378 B1   1/2001 Manginell et al.
(Continued)

FOREIGN PATENT DOCUMENTS

CN   101664228 A   3/2010
GB       863394 A   3/1961
(Continued)

OTHER PUBLICATIONS

International Search Report and Written Opinion for PCT/US2014/054391, dated Dec. 4, 2014.
(Continued)

*Primary Examiner* — Anita Nassiri-Motlagh
(74) *Attorney, Agent, or Firm* — Wolf, Greenfield & Sacks, P.C.

(57) ABSTRACT

Embodiments described herein provide materials and methods for the absorption or filtration of various species and analytes. In some cases, the materials may be used to remove or reduce the amount of a substance in vapor sample (e.g., cigarette smoke).

4 Claims, 8 Drawing Sheets

(51) Int. Cl.
    *B01J 20/32*     (2006.01)
    *B01D 53/02*     (2006.01)
    *A24D 3/06*     (2006.01)
    *B01J 20/24*     (2006.01)
    *A24D 3/14*     (2006.01)
    *B01D 53/04*     (2006.01)
    *A24D 3/16*     (2006.01)

(52) U.S. Cl.
    CPC .............. *B01D 53/02* (2013.01); *B01D 53/04* (2013.01); *B01J 20/24* (2013.01); *B01J 20/28023* (2013.01); *B01J 20/3212* (2013.01); *B01J 20/3217* (2013.01); *B01J 20/3246* (2013.01); *B01J 20/3248* (2013.01); *B01J 20/3255* (2013.01); *B01J 20/3293* (2013.01); *B01D 2253/202* (2013.01); *B01D 2257/7027* (2013.01); *B01D 2258/06* (2013.01)

(56) References Cited

U.S. PATENT DOCUMENTS

| | | | |
|---|---|---|---|
| 6,902,701 | B1 | 6/2005 | Hughes et al. |
| 2003/0000538 | A1* | 1/2003 | Bereman .............. A24B 15/245 131/352 |
| 2006/0249382 | A1 | 11/2006 | Hengstenberg et al. |
| 2009/0293590 | A1 | 12/2009 | Zeng et al. |
| 2010/0063225 | A1 | 3/2010 | Swager et al. |
| 2011/0159160 | A1 | 6/2011 | Jonsson et al. |
| 2012/0116094 | A1 | 5/2012 | Swager et al. |
| 2012/0220053 | A1 | 8/2012 | Lee et al. |
| 2013/0113359 | A1 | 5/2013 | Swager et al. |
| 2013/0220349 | A1* | 8/2013 | Robertson .............. A24D 3/061 131/207 |
| 2013/0273665 | A1 | 10/2013 | Swager et al. |
| 2014/0346042 | A1 | 11/2014 | Shimoyama et al. |
| 2015/0323482 | A1 | 11/2015 | Shimoyama et al. |
| 2016/0231267 | A1 | 6/2016 | Swager et al. |

FOREIGN PATENT DOCUMENTS

| | | |
|---|---|---|
| JP | 2001-526059 A | 12/2001 |
| JP | 2004-500901 A | 1/2004 |
| JP | 2011-526202 A | 10/2011 |
| WO | WO 99/32002 A1 | 7/1999 |
| WO | WO 02/00046 A1 | 1/2002 |
| WO | WO 2008/133779 A2 | 11/2008 |
| WO | WO 2009/136978 A2 | 11/2009 |
| WO | WO 2009/156763 A1 | 12/2009 |
| WO | WO 2010/123482 A2 | 10/2010 |
| WO | WO 2011/044221 A2 | 4/2011 |
| WO | WO 2011/056936 A2 | 5/2011 |
| WO | WO 2012/044778 A1 | 4/2012 |
| WO | WO 2012/067665 A1 | 5/2012 |

OTHER PUBLICATIONS

International Preliminary Report on Patentability for PCT/US2014/054391, dated Mar. 17, 2016.

International Search Report and Written Opinion for PCT/US2014/054405 dated Dec. 3, 2014.

International Preliminary Report on Patentability for PCT/US2014/054405 dated Mar. 17, 2016.

Esser et al., Selective detection of ethylene gas using carbon nanotube-based devices: utility in determination of fruit ripeness. Angew Chem Int Ed Engl. Jun. 4, 2012;51(23):5752-6. doi: 10.1002/anie.201201042. Epub Apr. 19, 2012.

Girschikofsky et al., Optical planar Bragg grating sensor for real-time detection of benzene, toluene and xylene in solvent vapour. Sensors and Actuators B: Chemical. Sep. 30, 2012;171:33842.

Im et al., Integrated Gas Sensing System of SWCNT and Cellulose Polymer Concentrator for Benzene, Toluene, and Xylenes. Sensors (Basel). Feb. 2, 2016;16(2):183. doi: 10.3390/s16020183.

Kadir et al., Optical waveguide BTX gas sensor based on polyacrylate resin thin film. Environ Sci Technol. Jul. 1, 2009;43(13):5113-6.

Kim et al., Analytical bias among different gas chromatographic approaches using standard BTX gases and exhaust samples. J Sep Sci. Feb. 2009;32(4):549-58. doi: 10.1002/jssc.200800556.

Li et al., Carbon Nanotube Sensors for Gas and Organic Vapor Detection. Nano Letters. Jun. 13, 2003;3(7):929-33. doi: 10.1021/nl034220x.

Lobez et al., Radiation detection: resistivity responses in functional poly(olefin sulfone)/carbon nanotube composites. Angew Chem Int Ed Engl. 2010;49(1):95-8. doi: 10.1002/anie.200904936.

Meadows et al., Alkali metal cation-pi interactions observed by using a lariat ether model system. J Am Chem Soc. Apr. 4, 2001;123(13):3092-107.

Parsons et al., Real-time monitoring of benzene, toluene, and p-xylene in a photoreaction chamber with a tunable mid-infrared laser and ultraviolet differential optical absorption spectroscopy. Appl Opt. Feb. 1, 2011;50(4):A90-9. doi: 10.1364/AO.50.000A90.

Shey et al., The azidation of starch. Carbohydrate polymers, 65(4), 529-534. doi:10.1016/j.carbpol.2006.02.009.

Tumbiolo et al., Determination of benzene, toluene, ethylbenzene and xylenes in air by solid phase micro-extraction/gas chromatography/mass spectrometry. Anal Bioanal Chem. Nov. 2004;380(5-6):824-30.

Young et al., Infrared hollow waveguide sensors for simultaneous gas phase detection of benzene, toluene, and xylenes in field environments. Anal Chem. Aug. 15, 2011;83(16):6141-7. doi: 10.1021/ac1031034. Epub Jun. 29, 2011. Erratum in: Anal Chem. Aug. 15, 2011;83(16):6147.

Zhang et al., Functionalization of single-walled carbon nanotubes and fullerenes via a dimethyl acetylenedicarboxylate-4-dimethylaminopyridine zwitterion approach. J Am Chem Soc. Jun. 27, 2007;129(25):7714-5. Epub Jun. 2, 2007.

Wang et al., Carbon Nanotube/Polythiophene Chemiresistive Sensors for Chemical Warfare Agents. J Am Chem Soc. Apr. 23, 2008;130(16):5392-3. doi: 10.1021/ja710795k. Epub Mar. 29, 2008.

Alam et al., Development of polyaniline-modified polysulfone nanocomposite membrane. Appl Water Sci. Nov. 29, 2011;2:37-46. Epub 2012.

Tunckol et al., Carbon nanomaterial-ionic liquid hybrids. Carbon. 2012;50(4):4303-34.

* cited by examiner

FIG. 1A

|  | F5Ph-CA | Ph-CA | Py-CA | Benz-CA | Calix-CA |
|---|---|---|---|---|---|
| DS | 0.8 | 0.59 | 0.46 | 0.42 | 0.5 |
| Mn (Da) | 85 K | 58 K | 65 K | 58 K | 89 K |
| PDI | 1.77 | 1.76 | 2.13 | 2.85 | 3.35 |

FIG. 1B

Route 1. Copper(I)-Catalyzed Azide-Alkyne Cycloaddition (CuACC) Reaction

(a) Step 1. One pot azidation (b) Step 2. Copper(I)-catalyzed azide-alkyne cycloaddition R = H or an organic side chain
R' = H or an organic group
Y = O, S, NR, CR=CR
n = greater than 1

R = H or an organic side chain
R' = H or an organic group
n = greater than 1

FILTER MATERIALS INCLUDING FUNCTIONALIZED CELLULOSE

RELATED APPLICATIONS

This application is a national stage filing under 35 U.S.C. § 371 of International Application Number PCT/US2014/054391, filed Sep. 5, 2014, entitled "Filter Materials Including Functionalized Cellulose" which claims priority to U.S. Provisional Patent Application Ser. No. 61/874,615, filed Sep. 6, 2013, and entitled "Filter Materials Including Functionalized Cellulose," which is incorporated herein by reference in its entirety for all purposes.

FIELD OF THE INVENTION

Embodiments described herein relate to absorbent materials useful in the filtration of species, and related methods.

BACKGROUND OF THE INVENTION

Methods for reducing the amount of aromatic species, including polycyclic aromatic hydrocarbons, in various products and/or the environment are desirable. Aromatic species can include polycyclic aromatic hydrocarbons, such as benzopyrene, as well as optionally substituted monocyclic aromatic groups, such as benzene, toluene, and xylene. For example, it is known that pyrolysis of tobacco produces various undesirable aromatic species. Cigarette smoke, in particular, is known to contain aromatic species such as benzene, toluene, and benzo[a]pyrene. Some aromatic species such as benzene, toluene, and xylenes are important chemicals as starting and intermediate materials for a wide range of products and are produced largely from petroleum, but are known to be toxic and benzene is classified as a carcinogen.

SUMMARY OF THE INVENTION

Embodiments described herein provide methods for reducing the amount of an aromatic species in a vapor sample. In some embodiments, the method comprises contacting a vapor sample containing a first concentration of an aromatic species with a composition comprising a polymeric absorbent material attached to at least one aromatic binding site such that the vapor phase sample has a second concentration of the aromatic species after contact with the composition, wherein the second concentration is less than the first concentration.

Embodiments described herein also provide filter materials. In some embodiments, the filter material comprises a fiber or network of fibers comprising a cellulose-based polymer comprising at least one aromatic binding site.

Figure 1C:
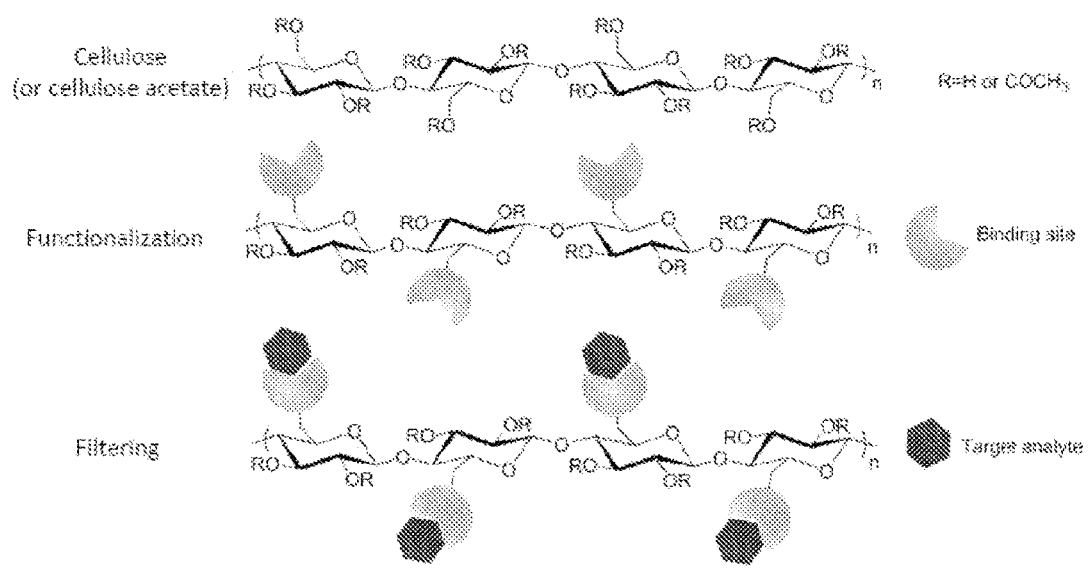
FIG. 1 shows (a) a schematic diagram of a filter material containing a functionalized cellulose acetates, according to one embodiment; (b) examples of functionalized cellulose acetates (DS: degree of substitution, Mn: number average molecular weight, and PDI: polydispersity index); and (c) a schematic diagram for functionalization of cellulose acetate and its use in filter applications.

Other aspects, embodiments and features of the invention will become apparent from the following detailed description when considered in conjunction with the accompanying drawings. The accompanying figures are schematic and are not intended to be drawn to scale. For purposes of clarity, not every component is labeled in every figure, nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

DETAILED DESCRIPTION

Embodiments described herein provide materials and methods for the absorption or filtration of various species and analytes. In some cases, the materials may be particularly effective in the removal or reduction in the amount of a substance in sample. For example, the material may be capable of selectively binding a particular species or set of species in a vapor sample. Embodiments described herein provide materials for use as filters with high sensitivity and selectivity that can be readily tailored to suit a particular application.

Some embodiments involve the use of an absorbent material to selectively absorb, trap, and/or filter chemicals (e.g., gases and/or liquids). In some cases, the absorbent material may interact with (e.g., bind) toxins, pollutants, or other undesirable species. In some embodiments, the absorbent material may be in substantially solid form. For example, the absorbent material may be formed as a layer, coating, powder, fiber, or other solid articles. In some embodiments, the absorbent material is in the form of a fiber or a network of fibers. In some cases, the absorbent material is a polymeric material such as a cellulose-based polymer. The absorbent material may be capable of interacting with a species (e.g., in vapor phase), such that the species intercalates or diffuses into the absorbent material. That is, the absorbent material can be useful as a filter or "trap" for the species. In some embodiments, the absorbent material may include moieties that bind or otherwise associate with species of interest, as described more fully below.

The absorbent material may include one or more binding sites that selectively interact with one or more species and may be incorporated within the absorbent material in various configurations. For example, the binding site may be a small molecule, a polymer, a biological binding site, or the like. In some embodiments, the binding site may comprise ionic binding site (e.g., a salt). In some embodiments, the binding site may comprise a neutral binding site. The binding site may be an organic, organometallic, or an inorganic binding site. In some cases, the binding site may be attached to the absorbent material via a covalent bond. In some cases, the binding site may be substantially contained within (e.g., dispersed within) the absorbent material, and may not form a covalent bond to the absorbent material. In some embodiments, the absorbent material layer may include a polymer material that is attached to a plurality of binding sites. The plurality of binding sites may be covalently or non-covalently bonded to the polymer material. In some cases, the plurality of binding sites may be dispersed throughout the polymer material.

The interaction between the species and the binding site may comprise formation of a bond, such as a covalent bond (e.g. carbon-carbon, carbon-oxygen, oxygen-silicon, sulfur-sulfur, phosphorus-nitrogen, carbon-nitrogen, metal-oxygen or other covalent bonds), an ionic bond, a hydrogen bond (e.g., between hydroxyl, amine, carboxyl, thiol and/or similar functional groups, for example), a dative bond (e.g. complexation or chelation between metal ions and monodentate or multidentate ligands), and the like. The interaction may also comprise Van der Waals interactions. In one embodiment, the interaction comprises forming a covalent bond with a species. In some cases, the interaction between the species and the binding site may include an electrostatic interaction (e.g., between relatively electron-rich moieties of a species and relatively electron-poor moieties of the absorbent material, or between relatively electron-poor moieties of a species and relatively electron-rich moieties of the absorbent material). In an illustrative embodiment, the absorbent material may include a plurality of electron-poor fluoro-substituted aromatic groups capable of interacting with (e.g., binding) electron-rich aromatic species, including polyaromatic hydrocarbons such as benzopyrene. In some embodiments, the absorbent material may include orbitals (e.g., p-orbitals) that may sufficiently overlap with orbitals present on a particular species. For example, the interaction may involve pi-pi stacking between a conjugated pi-system of the absorbent material with various polycyclic aromatic hydrocarbons, including undesirable components of cigarette smoke, such as benzopyrene.

In some cases, the binding site may comprise a biological or a chemical group capable of binding another biological or chemical molecule in a medium (e.g., solution, vapor phase, solid phase). For example, the binding site may include a functional group, such as a thiol, aldehyde, ester, carboxylic acid, hydroxyl, and the like, wherein the functional group forms a bond with the species. In some cases, the binding site may be an electron-rich or electron-poor moiety wherein interaction between the species and the binding site comprises an electrostatic interaction. In some cases, the interaction between the species and the binding site includes binding to a metal or metal-containing moiety. The binding site may also interact with a species via a binding event between pairs of biological molecules including proteins, nucleic acids, glycoproteins, carbohydrates, hormones, and the like.

In some cases, the binding site may be an aromatic binding site and may include optionally substituted monocyclic aromatic groups (e.g., phenyl groups). In some embodiments, the aromatic binding site may include polycyclic aromatic hydrocarbons (e.g., naphthalene, phenanthrene, pyrene, anthracene, fluoranthene, perylene, benzopyrene, etc.), any of which are optionally substituted. In some cases, the aromatic binding site may be substituted with one or more halo-containing groups. In one set of embodiments, the aromatic binding site is a fluorine-containing aromatic species. For example, the aromatic binding site may be an aromatic species substituted with one or more fluoro-groups, or one or more fluoroalkyl groups (e.g., —CF$_3$). As an illustrative embodiment, the aromatic binding site may include an electron-deficient aromatic group, such as a pentafluorophenyl group, which may be useful in the determination of electron-rich aromatic species, such as benzopyrene (e.g., benzo[a]pyrene).

In some embodiments, the binding site may be a metal-containing binding site. For example, the binding site may include metal salts or metal complexes (e.g., organometallic complexes). In some embodiments, the metal salt is a transition metal salt. In some cases, the binding site may include a metal complex or metal salt comprising Cu(I), Cu(II), Ag(I), Ag(II), Rh(I), Rh(III), Ir(I), Ir(III) or Pd(II). Some examples of metal salts or metal complexes include, but are not limited to, TiO$_2$, TiCl$_4$, and other titanium salts, AgCl, AgPF$_6$, Ag(OCOCF$_3$), Ag(SO$_3$CF$_3$), and other silver salts, PtCl$_2$ and other platinum salts, Au$_2$Cl$_6$ and other gold salts, Al(OEt)$_3$ and other aluminum salts, Ni(SO$_3$CF$_3$)$_2$, NiCl$_2$, and other nickel salts, and Cu(SO$_3$CF$_3$) and other copper salts. In some cases, the binding site may be a copper-containing binding site. In some cases, the copper-containing binding site is a salt, such as a Cu(II) salt. In some cases, the binding site may be a palladium-containing binding site. In some cases, the palladium-containing binding site is a salt, such as a Pd(II) salt. Some examples of specific metal containing binding site include, but are not limited to,

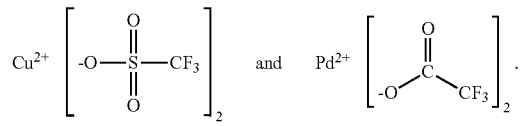

In some embodiments, the binding site may be a metal complex capable of interacting with ethylene. An example of such a metal complex is described in Esser et al., "Selective Detection of Ethylene Gas Using Carbon Nanotube-based Devices: Utility in Determination of Fruit Ripeness," Angew. Chem. Int. Ed. 2012, 51(23), 5752-5756, the contents of which are incorporated herein by reference in its entirety for all purposes.

In some embodiments, the binding site may be a quinone-containing binding site or an oxidized derivative of an aromatic group, including polycyclic aromatic groups. Examples of such binding site include 1,4-benzoquinones or cyclohexadienediones, 1,2-benzoquinones (ortho-quinones), 1,4-naphthoquinones and 9,10-anthraquinones. And the like. In one embodiment, the binding site is 2,3-dichloro-5,6-dicyano-1,4-benzoquinone (DDQ).

In some cases, the binding site may include a calixarene group. The calixarene group may include a plurality of aromatic rings (e.g., phenyl rings). In some embodiments, the calixarene includes 4 to 12 aromatic rings.

In some cases, the binding site may include a iptycene group (e.g., triptycene, pentiptycene, etc.).

In some cases, the binding site may include a hydrogen-bond donor. In some cases, the binding site may include a hydrogen bond acceptor. Those of ordinary skill in the art would be able to identify hydrogen-bond donors or hydrogen-bond acceptors suitable for use in embodiments described herein. For example, a hydrogen-bond donor may comprise at least one hydrogen atom capable of interacting with a pair of electrons on a hydrogen-bond acceptor to form the hydrogen bond. In some cases, the hydrogen atom may be positioned adjacent to an electron-poor group, such as fluorine, nitro, acyl, cyano, sulfonate, or the like, to increase the acidity of the hydrogen atom and, thus, the ability of the hydrogen atom to form a hydrogen bond. Other examples of groups which may form hydrogen bonds include carbonyl groups, amines, hydroxyls, and the like. In one embodiment, the hydrogen-bond donor is a fluorinated alcohol, such as hexafluoroisopropanol. In some embodiments, the hydrogen-bond acceptor may be a carbonyl group, an amine, an imine, or other groups containing a pair of electrons that can interact with a hydrogen atom on another species via hydrogen bonding.

Some specific examples of binding sites include the following groups:

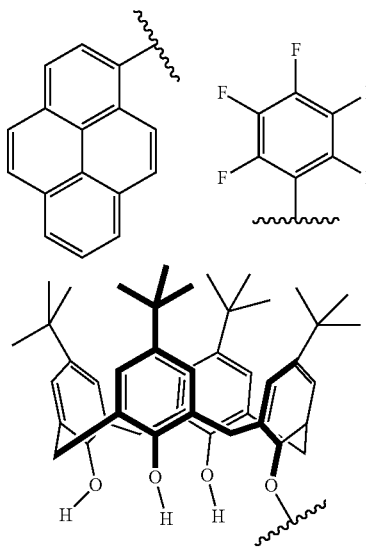

Some embodiments involve the use of a polymeric absorbent material. In some cases, the polymeric absorbent material may include a conjugated polymer (e.g., pi-conjugated, sigma-conjugated), or a non-conjugated polymer (e.g., cellulose-based polymer). In some embodiments, the polymeric absorbent material layer includes a polyvinyl alcohol-based material. In some embodiments, the polymeric absorbent material layer includes a polyhydroxyl ethyl methacrylate-based material. In some cases, the polymer may include one or more iptycene-based groups (e.g., triptycenes, pentiptycenes, etc.). In each of these cases, the polymer may be appropriately functionalized to be responsive to a particular species or set of species.

In some embodiments, the polymeric absorbent material layer may include a cellulose-based polymer. For example, the cellulose-based polymer can be cellulose, cellulose acetate, cellulose diacetate, or cellulose triacetate, any of which is optionally substituted. In some embodiments, the cellulose-based polymer is cellulose substituted with at least one binding site. For example, the cellulose-based polymer may include a functional group that contains an aromatic moiety (e.g., an electron deficient aromatic moiety) that is capable of binding an aromatic species. The aromatic moiety may be, for example, an optionally substituted monocyclic aromatic group (e.g., phenyl group) or an optionally substituted polycyclic aromatic hydrocarbon. In some cases, the cellulose-based polymer is functionalized with a calixarene group. In cases where the target species is an electron rich species (e.g., benzo[a]pyrene), the aromatic moiety may be substituted with electron deficient groups, such as fluoro groups, to enhance interaction with the target species.

In one set of embodiments, the cellulose-based polymer contains the structure,

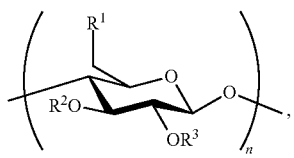

wherein:

$R^1$ is a group comprising an aromatic binding site for an aromatic species;

$R^2$ and $R^3$ can be the same or different and are hydrogen, alkyl, aryl, a carbonyl group, any of which is optionally substituted; and n is greater than 1.

In some cases, $R^2$ and $R^3$ can be the same or different and are hydrogen, —$COCH^3$, or —$F^5Ph$. In some cases, $R^2$ and $R^3$ are the same. In some cases, $R^2$ and $R^3$ are different.

In another set of embodiments, the cellulose-based polymer contains the structure,

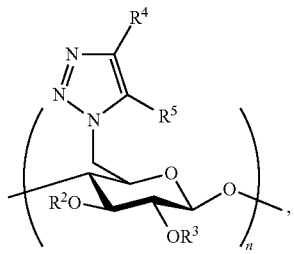

wherein $R^4$ and $R^5$ can be the same or different and are hydrogen, alkyl, alkenyl, aryl, heteroalkyl, heteroalkenyl, heteroaryl, or carbonyl group, any of which is optionally substituted.

In another set of embodiments, the cellulose-based polymer contains the structure,

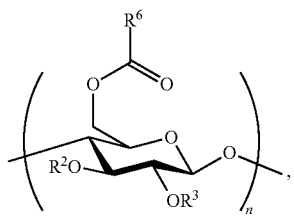

wherein $R^6$ is alkyl, alkenyl, aryl, heteroalkyl, heteroalkenyl, or heteroaryl, any of which is optionally substituted.

In some cases, the cellulose-based polymer may include one of the following groups,

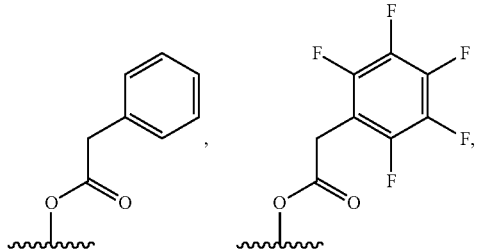

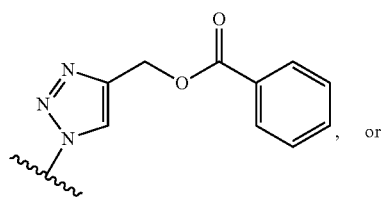

, or

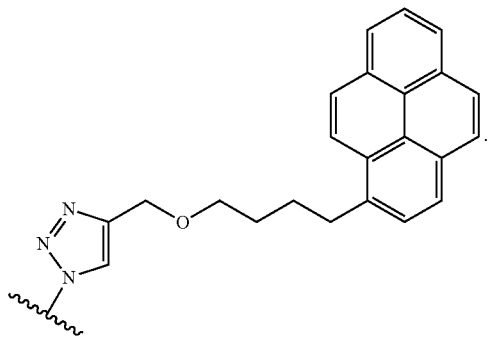

In some cases, the absorbent material may include an iptycene-based polymer. For example, the iptycene-based polymer may include one or more of the following groups,

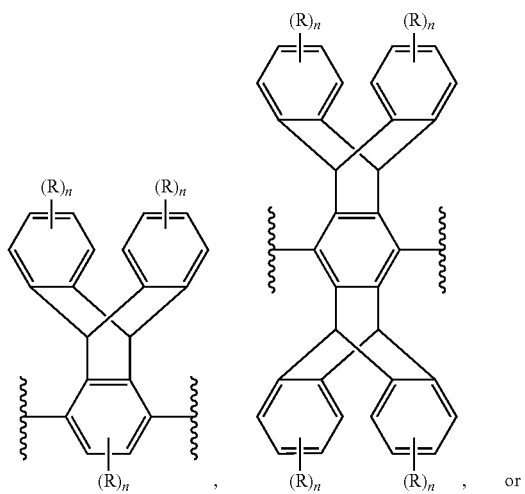

, or

-continued

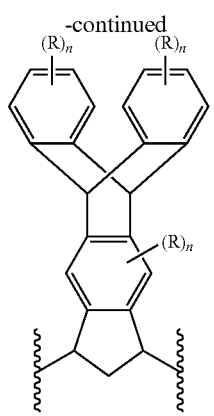

, wherein each R can be the same or different and is H or a substituent (e.g., an organic substituent) and n is an integer between 0 and 4. In some cases, each R is independently selected from H, halide, or an organic group (e.g., an organic side chain). In some cases, at least one R is a group comprising a binding site as described herein. In some cases, the iptycene-based polymer may include a conjugated polymer backbone (e.g., pi-conjugated polymer backbone), such as polyarylenes, poly(arylene vinylene)s, poly(arylene ethynylene)s, and the like. In some cases, the iptycene-based polymer may include a non-conjugated polymer, such as polyethers, polysulfones, polycarbonates, polyacrylates, and the like.

In some embodiments, a filter material is provided containing any of the absorbent materials described herein. For example, the filter material may include a fiber or network of fibers that contains a cellulose-based polymer, as described herein. In some cases, the fiber or network of fibers may be arranged as a solid-phase microextraction material. In one set of embodiments, the materials described herein may be useful as cigarette filter materials. (FIG. 1) For example, the material may be arranged in a cigarette, or related product or device containing tobacco, and the sample contacting the material may be vapor generated by the cigarette, i.e., cigarette smoke. In some cases, the material may be arranged in a smoking article containing tobacco, wherein the article is configured to burn tobacco. In some cases, the material may be arranged in a smoking article containing tobacco, wherein the article is configured to heat tobacco. The material may be effective in reducing the amount of undesirable substances found in cigarette smoke, including various species as described herein.

The filter may include additional components that may improve the selectivity, sensitivity, or stability of the materials discussed herein, or that may otherwise enhance performance of the filter. For example, the filter may include other non-selective or selective sorbent materials. As one example, the filter could include activated carbon. The additional sorbent material could be disposed upstream of, downstream of, or in the same section of the filter as, the sorbent materials described herein.

Methods described herein may be effective in reducing the amount of, or even removing, a substance (e.g., toxic compounds) from a sample. In some cases, the sample is a vapor phase sample. In some embodiments, the sample is a liquid sample. In some embodiments, the sample is an aerosol sample. The term "sample" refers to any material (e.g., in vapor phase, liquid phase, solid phase, aerosols, etc.) containing a species to be purified, filtered, absorbed, adsorbed, chemically altered, or otherwise advantageously evaluated in accordance with the embodiments described herein. In some cases the sample is a vapor phase sample drawn or derived from a composition or device comprising tobacco (e.g., a cigarette). For example, the method may involve contacting a vapor phase sample containing a first concentration of the species with a composition comprising an absorbent material as described herein. Upon contacting the composition, the vapor phase sample may have a second concentration of the species, which is less than the first concentration. In some embodiments, the concentration of the species may be reduced by at least 5%, at least 10%, at least 20%, at least 30%, at least 40%, at least 50%, at least 60%, at least 70%, at least 80%, at least 90%, at least 95%, or, in some cases, at least 99%.

In some cases, the absorbent material may physically prevent a species from diffusing away from the absorbent material by binding or otherwise interacting with the species. For example, the absorbent material may be arranged within a cigarette filter, such that the absorbent material prevents undesirable species present within the generated cigarette smoke (e.g., benzopyrene) from exiting the filter.

Absorbent materials described herein may be synthesized using various methods known in the art. In the case of polymeric absorbent materials, the polymers may be synthesized according to known methods, including, but not limited to, cationic polymerization, anionic polymerization, radical polymerization, condensation polymerization, Wittig polymerization, ring-opening polymerization, cross-coupling polymerization, addition polymerization, chain polymerization, metathesis polymerization, or the like. Those of ordinary skill in the art would be able to select the appropriate monomers in order to obtain a desired polymeric product. For example, monomers comprising two hydroxyl groups may be polymerized with monomers comprising two carbonyl groups (e.g., acyl halide, carboxylic acid, etc.) to form a polyether via condensation polymerization. Likewise, monomers comprising a styrene moiety may be polymerized to form polystyrene via radical polymerization. In one embodiment, monomers comprising di-acetylene substituted aryl groups may be polymerized with monomers comprising di-halide substituted aryl groups to form poly(arylene ethynylene)s via cross-coupling polymerization.

In some embodiments, a plurality of filter materials may be arranged to form system capable of binding, filtering, trapping, absorbing, or otherwise sequestering a variety of different species simultaneously. For example, a series of filter materials may be arranged in an array, wherein each individual filter material can include a binding site capable of interacting with a particular species. In some cases, a first filter material of a system may include a binding site capable of interacting with a first species and a second filter material of the system may include a binding site capable of interacting with a second species, wherein the first and second species are different.

In some embodiments, a single filter material may include a mixture of different binding sites capable of determining a plurality of different species.

Polymers may be substituted with various binding sites using methods known in the art. In some cases, a polymer containing one or more hydroxyl functional groups may be utilized as starting material. In some cases, the hydroxyl functional group may be an alcohol (e.g., a primary alcohol, secondary alcohol, tertiary alcohol). The hydroxyl group may then be functionalized using various chemical reactions known in the art, including esterification. Cellulose-based polymers contain a plurality of hydroxyl functional groups that may be functionalized with binding sites.

Figure 3:
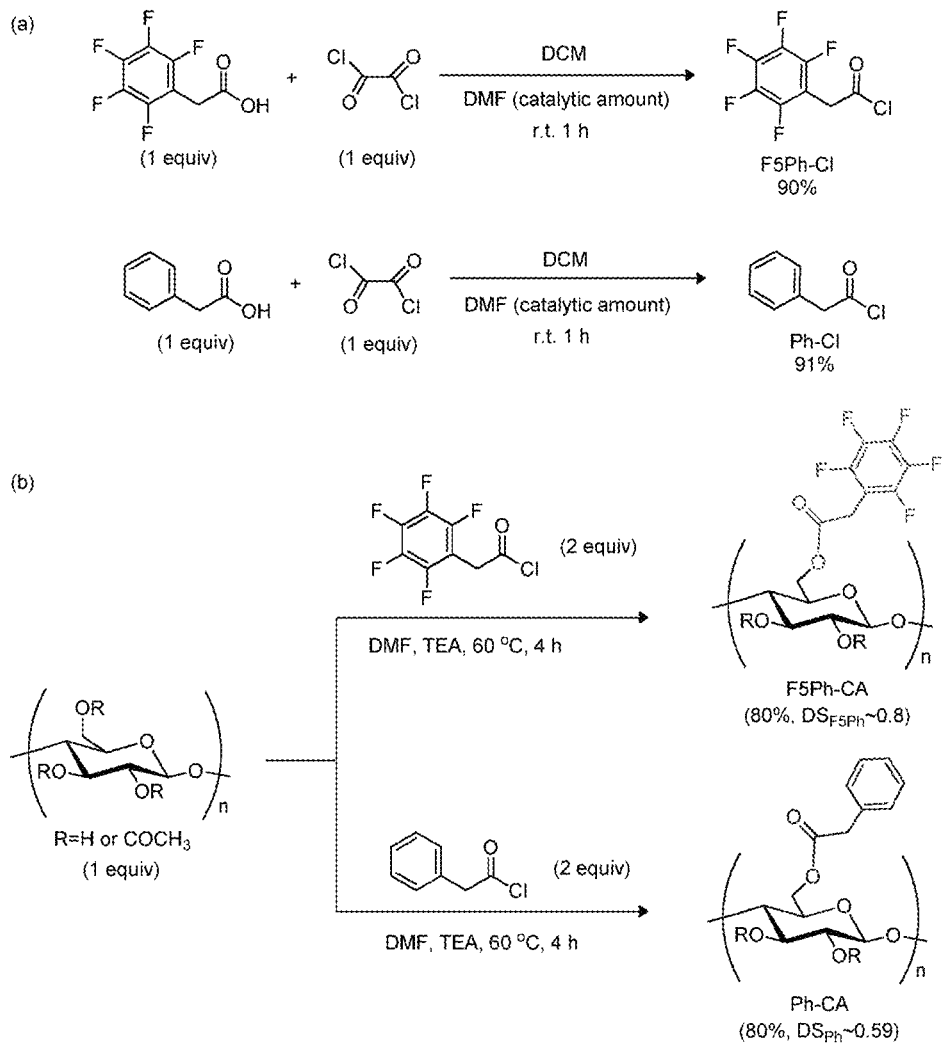
FIG. 3 shows (a) the syntheses of pentafluorophenylacetyl chloride (F5Ph-Cl) and phenyacetyl chloride (Ph-Cl) and (b) functionalization of cellulose acetate with F5Ph-Cl and Ph-Cl receptors via esterification.
Figure 4A:
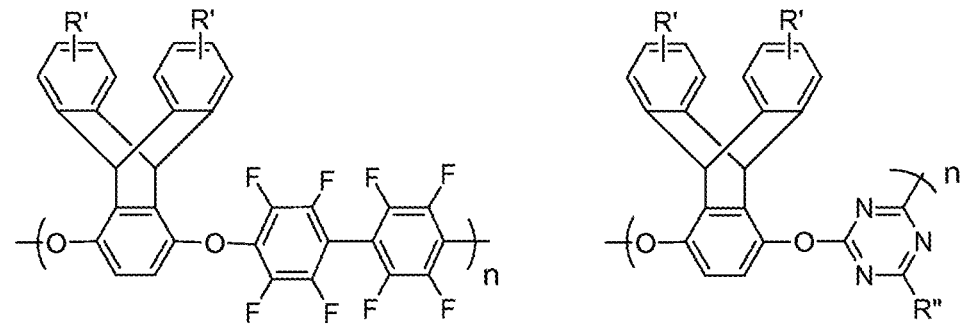
FIG. 4 shows examples of (a) triptycene-based polymers and (b) pentiptycene-based polymers.
Figure 4A:
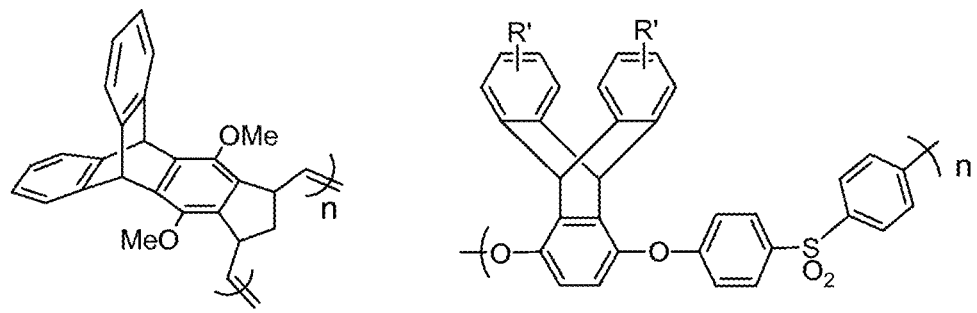
Figure 4A:
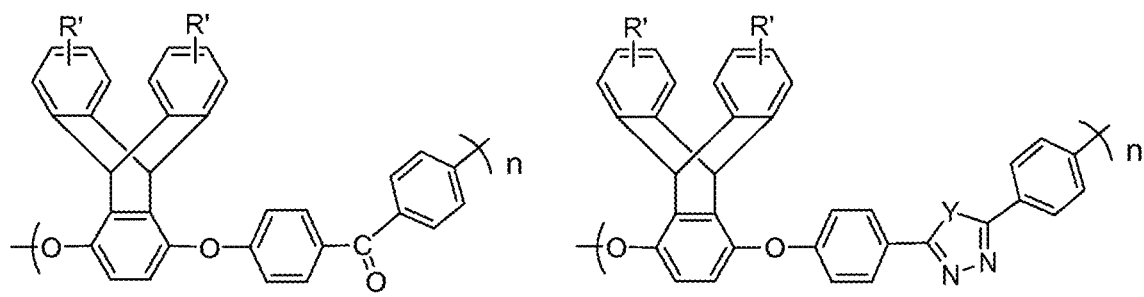
Figure 4B:
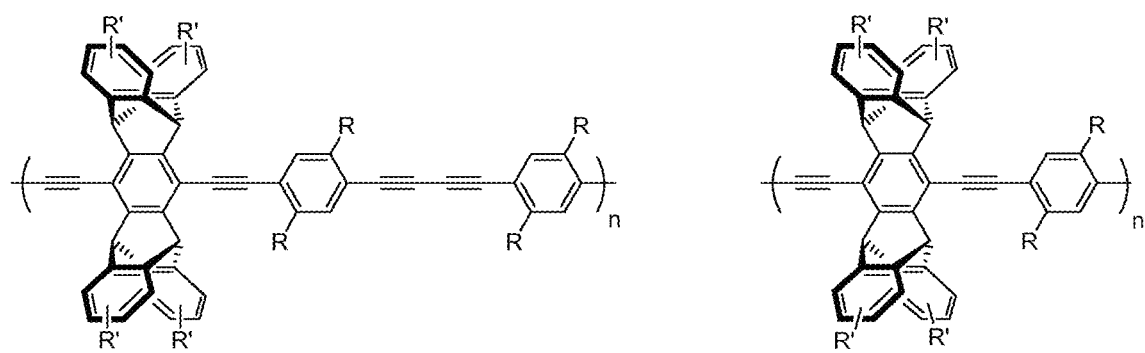
Figure 5:
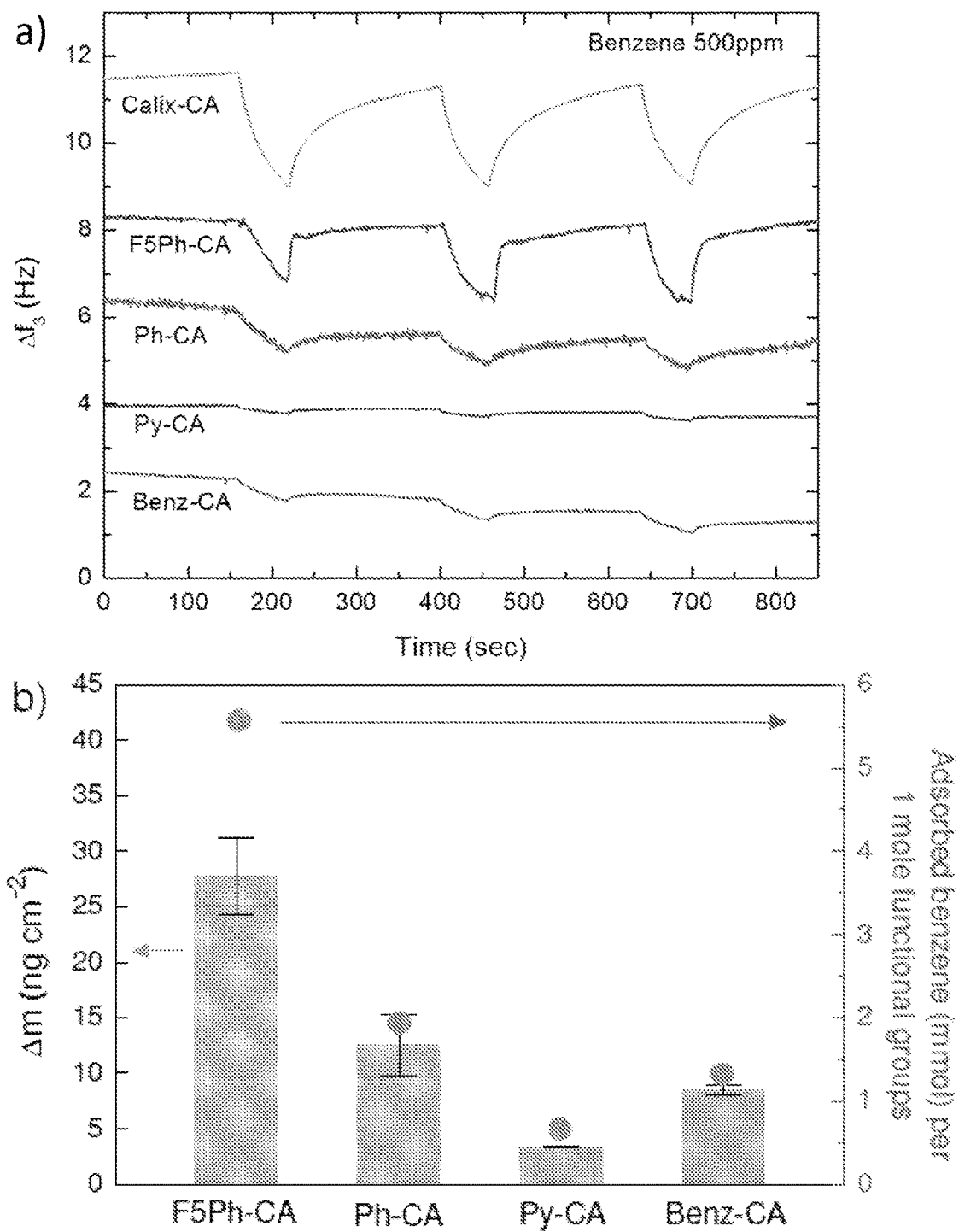
FIG. 5 shows frequency changes (Δf3, 3rd overtone) and mass uptakes (Δm) of the functionalized cellulose acetates of F5Ph-CA, Ph-CA, Py-CA, Benz-CA, and Calix-CA when exposed to 500 ppm of benzene and toluene vapors: (a) and (c) frequency changes upon exposure to benzene and toluene, respectively; (b) and (d) mass uptakes upon exposure to benzene and toluene, respectively.
Figure 5:
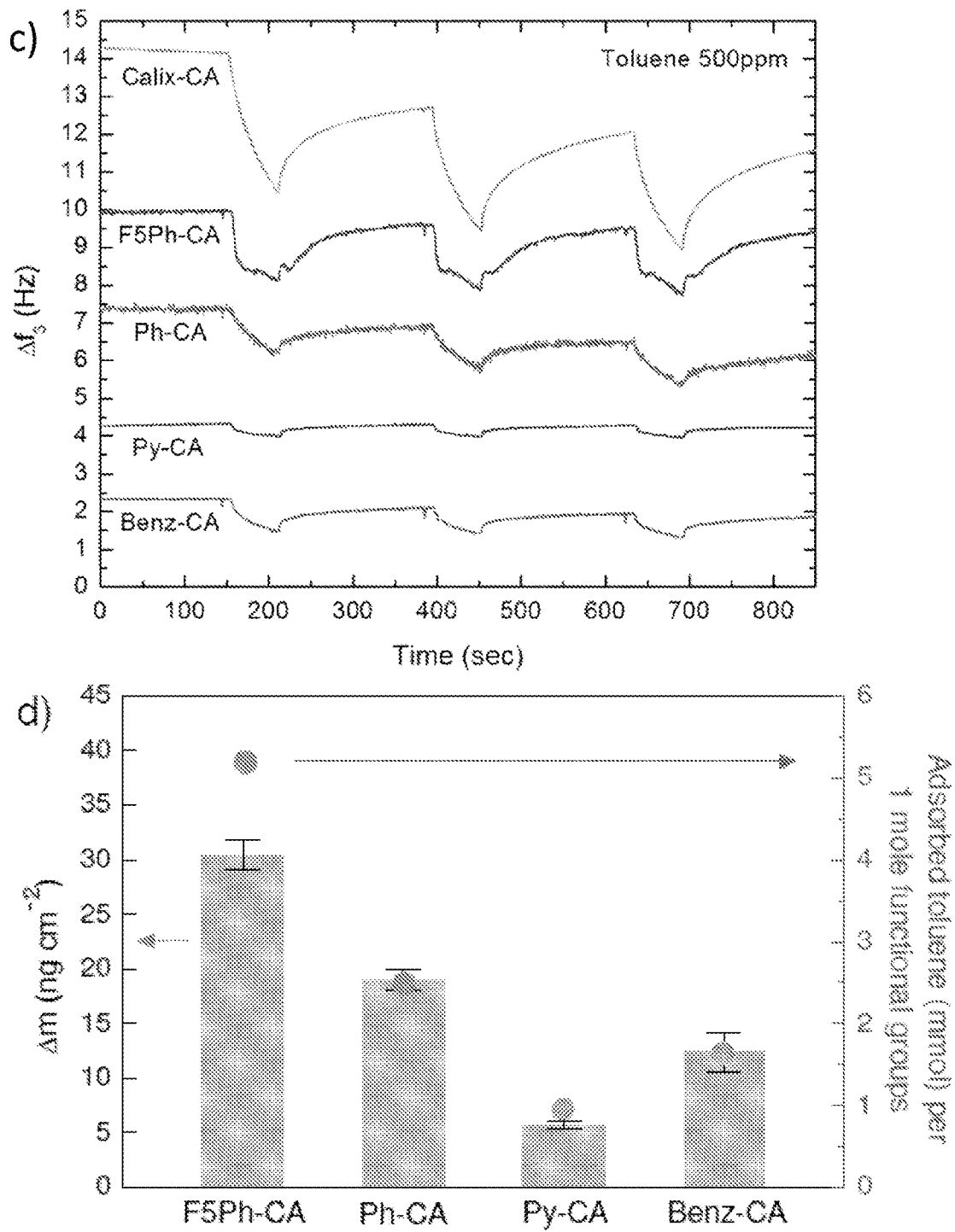

In one set of embodiments, a polymer containing hydroxyl groups may be functionalized using an esterification reaction. For example, the polymer may be reacted with a binding site precursor containing a functional group that can react with the hydroxyl group of the polymer via an esterification reaction. In some cases, the functional group may be an acid chloride. The esterification reaction may be catalyzed by an acid (e.g., acetic acid) or a base (e.g., triethylamine). In other embodiments, a polymer may include a hydroxyl group which may be treated with a binding site precursor, a phosphine (e.g., triphenylphosphine, TPP), and diethylazodicarboxylate (DEAD) or diisopropyl azodicarboxylate (DIAD) under Mitsunobu reaction conditions to form an ester. Those of ordinary skill in the art would be capable of selecting the appropriate combination of polymer, binding site precursor, and esterification reaction conditions suitable for a particular desired product. FIG. 3 shows one embodiment where 2,3,4,5,6-pentafluorophenylacetyl- and phenylacetyl-functionalized cellulose acetates (F5Ph-CA and Ph-CA) may be synthesized by esterification reaction of cellulose acetates with 2,3,4,5,6-pentafluorophenylacetyl chloride and phenylacetyl chloride in the presence of triethylamine, respectively.

Figure 2:
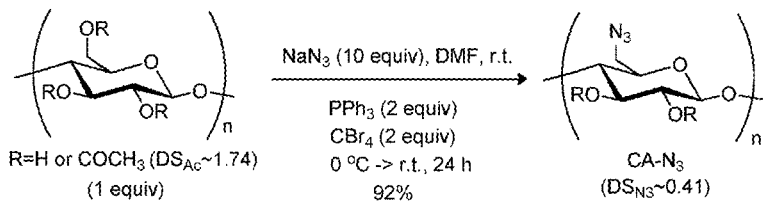
FIG. 2 shows synthetic schemes for (a) 6-deoxy-6-azido cellulose acetate (CA-N3) via one pot azidation and (b) copper(I)-catalyzed azide-alkyne cycloaddition reaction (CuAAC) of 6-deoxy-6-azido cellulose acetate with propargyl receptors.
Figure 2:
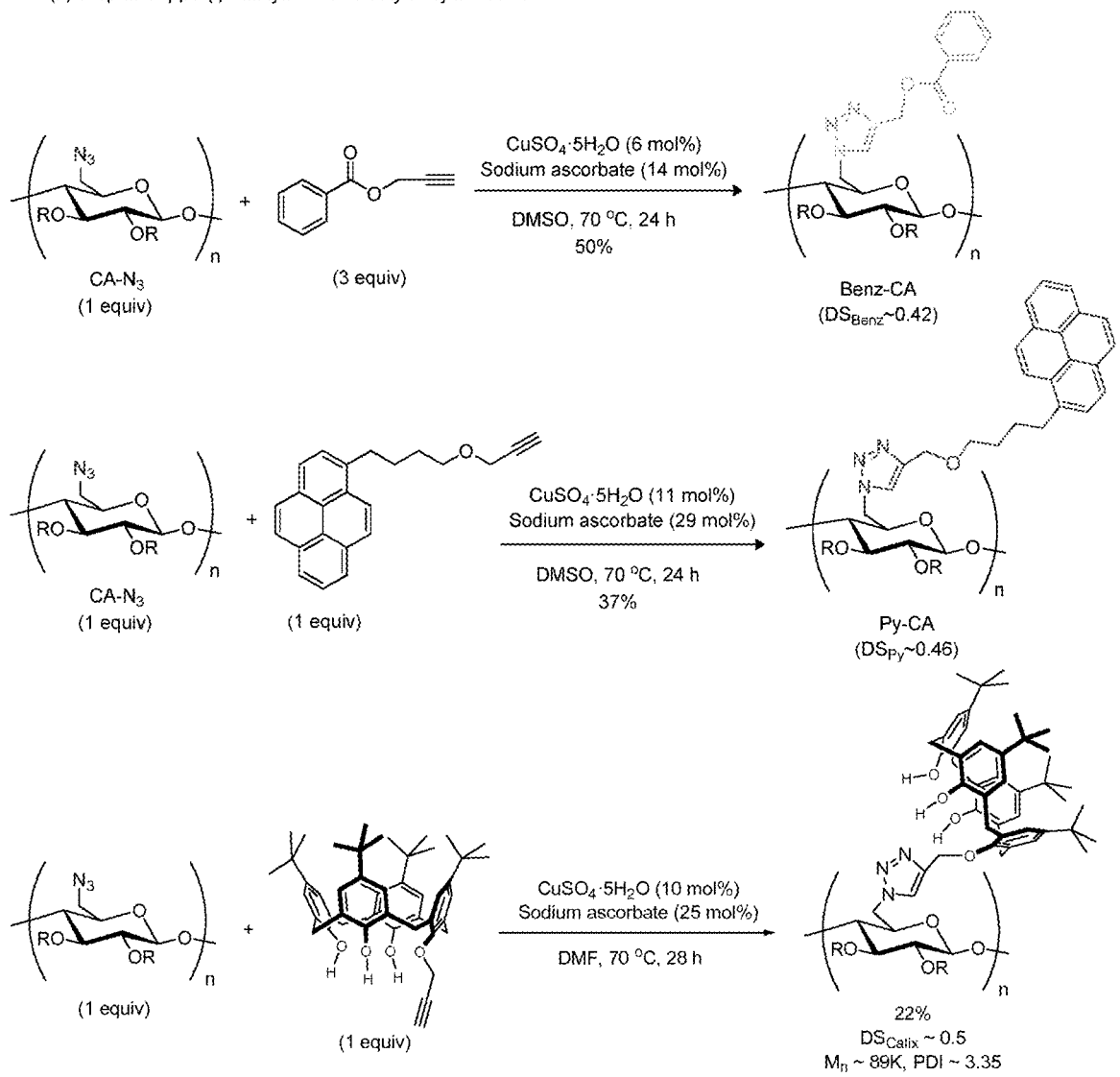

In one set of embodiments, a polymer containing hydroxyl groups may be reacted to form a moiety capable of reacting via a 1,3-dipolar cycloaddition reaction, i.e., via "click chemistry." For example, a primary alcohol may be converted to an azide group by treatment with sodium azide, and the azide group may be reacted with a binding site precursor containing a dipolarophile group (e.g., an alkyne) via a cycloaddition reaction. In some embodiments, the cycloaddition reaction may be catalyzed by a metal such as copper. FIG. 2 shows one embodiment where cellulose acetate with the degree of substitution of acetyl groups (DSAc) of 1.74 is used as a starting material. Pyrene- and benzoate-functionalized cellulose acetates (Py-CA and Benz-CA) may be synthesized via copper (I)-catalyzed azide-alkyne cycloaddition (CuAAC) reaction between propargyl pyrenebutyl ether and benzoate and 6-deoxy-6-azido cellulose acetates, respectively.

In some embodiments, a cellulose-based polymer may be functionalized with various binding sites using methods described herein.

Polymers or polymeric materials, as used herein, refer to extended molecular structures comprising a backbone (e.g., non-conjugated backbone, conjugated backbone) which optionally contain pendant side groups, where "backbone" refers to the longest continuous bond pathway of the polymer. In some embodiments, the polymer is substantially non-conjugated or has a non-conjugated backbone. In some embodiments, at least a portion of the polymer is conjugated, i.e. the polymer has at least one portion along which electron density or electronic charge can be conducted, where the electronic charge is referred to as being "delocalized." A polymer may be "pi-conjugated," where atoms of the backbone include p-orbitals participating in conjugation and have sufficient overlap with adjacent conjugated p-orbitals. It should be understood that other types of conjugated polymers may be used, such as sigma-conjugated polymers.

The polymer can be a homo-polymer or a co-polymer such as a random co-polymer or a block co-polymer. In one embodiment, the polymer is a block co-polymer. An advantageous feature of block co-polymers is that they may mimic a multi-layer structure, wherein each block may be designed to have different band gap components and, by nature of the chemical structure of a block co-polymer, each band gap component is segregated. The band gap and/or selectivity for particular analytes can be achieved by modification or incorporation of different polymer types, as would be understood by those of ordinary skill in the art. The polymer compositions can vary continuously to give a tapered block structure and the polymers can be synthesized by either step growth or chain growth methods.

The number average molecular weight of the polymer may be selected to suit a particular application. As used herein, the term "number average molecular weight (Mn)" is given its ordinary meaning in the art and refers to the total weight of the polymer molecules in a sample, divided by the total number of polymer molecules in a sample. Those of ordinary skill in the art will be able to select methods for determining the number average molecular weight of a polymer, for example, gel permeation chromatography (GPC). In some cases, the GPC may be calibrated vs. polystyrene standards. In some cases, the number average molecular weight of the polymer is at least about 10,000, at least about 20,000, at least about 25,000, at least about 35,000, at least about 50,000, at least about 70,000, at least about 75,000, at least about 100,000, at least about 110,000, at least about 125,000, or greater.

Any chemical, biochemical, or biological species may interact with (e.g., be filtered by) materials described herein. The species may be in vapor phase, liquid phase, or solid phase. In some embodiments, the species is a vapor phase species. In some cases, the species may be a chemical species, such as a toxin or pollutant.

In some embodiments, the species may be an aromatic species, including optionally substituted aryl species and/or optionally substituted heteroaryl species, such as benzene, toluene, xylene, or polycyclic aromatic hydrocarbons such as benzo[a]pyrene. In some embodiments, the aromatic species is a polycyclic aromatic hydrocarbon. In one set of embodiments, the aromatic species is benzopyrene. In some embodiments, the aromatic species is a monocyclic aromatic group (e.g., benzene, toluene, xylene). It should be understood that these aromatic species are described herein by way of example only, and other aromatic species may also be filtered using methods described herein.

In some embodiments, the species may be an amine-containing species such as ammonia. In some embodiments, the species may be a nitrile-containing species such as acetonitrile. In some embodiments, the species may be an oxygen-containing species, such as a species comprising an alcohol, a ketone, an ester, a carboxylate, an aldehyde, other carbonyl groups, an ether, or the like. In some embodiments, the species may be a species comprising a ketone, an ester, an ether, or an aldehyde, such as cyclohexanone, ethyl acetate, THF, or hexanal. In some embodiments, the species is a phosphorus-containing species such as DMMP. In some embodiments, the species may be a nitro-containing species such as nitromethane or TNT. Other examples of species include alcohols, olefins, nitric oxide, thiols, thioesters, and the like.

Having thus described several aspects of some embodiments of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

Examples and Embodiments

Materials and Measurements. Chemicals were purchased from Sigma-Aldrich, Alfa Aesar, and Macron Chemicals and used as received except that THF was dried by distillation. Deuterated solvents for NMR were obtained from Cambridge Isotope Laboratories, Inc. Cellulose acetate (CA-320S NF/EP) with the acetyl content of 31.9 wt % was kindly provided from Eastman. The analytes including benzene, toluene, ortho-, meta-, and para-xylenes, ethanol, and n-heptane were reagent grade and used as received.

$^1$H, $^{13}$C, and $^{19}$F NMR spectra were recorded on Varian Mercury (300 MHz) and Inova (500 MHz) NMR spectrometers. The $^{13}$C NMR spectra for functionalized cellulose acetates were recorded at 60° C. Chemical shifts are reported in parts per million (ppm) and referenced to the residual solvent resonance. FT-IR spectra were obtained on a NICO-LET 6700 FT-IR (Thermo Scientific) in attenuated total reflectance (ATR) mode using a Ge crystal plate. Thermal stabilities of functionalized cellulose acetates were studied using a thermogravimetric analysis (TGA, Discovery TGA from TA Instruments). Weight loss was monitored by heating a sample from 30° C. to 600° C. at a heating rate of 20° C./min under air atmosphere. The number average molecular weight (Mn), weight average molecular weight (Mw), and polydispersity index (PDI) were obtained from a gel permeation chromatography (GPC, Agilent 1100 Series). THF was used as a solvent and a refractive index detector was used to obtain the molecular weights of functionalized cellulose acetates.

Example 1

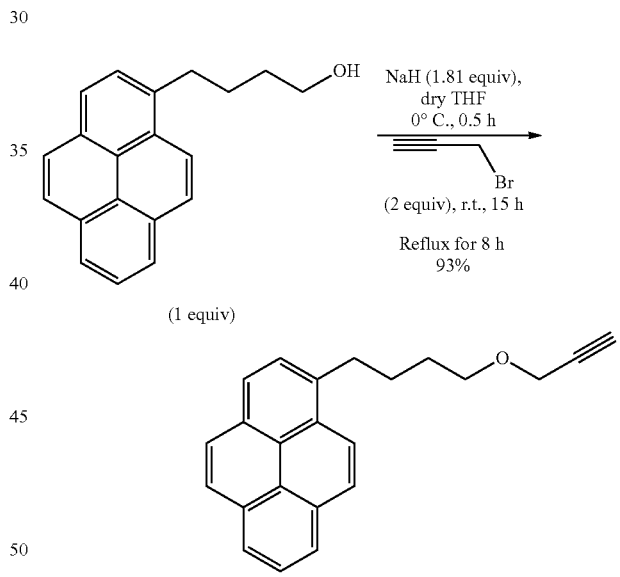

Propargyl pyrenebutyl ether was synthesized according to the following procedure. The reaction was conducted by the procedure described in J. M. Lobez, T. M. Swager, *Angew. Chem. Int. Ed.* 2010, 49, 95-98. Sodium hydride (NaH, 60 wt % in oil, 0.633 g, 26.39 mmol) was added to a solution of 1-pyrenebutanol (4 g, 14.58 mmol) in dry THF (45 ml) at 0° C. under argon atmosphere. The mixture was stirred at 0° C. for 30 min, and propargyl bromide (80 wt % in toluene, 3.469 g, 29.16 mmol) was added. The solution was stirred at 0° C. in the dark for 30 min and allowed to warm up to room temperature. After stirring for 15 h at room temperature, the reaction was heated to reflux for 8 h. Ethyl acetate (20 ml) and distilled water (20 ml) were added to the solution, and the aqueous phase was extracted twice with 20 ml of ethyl acetate. The combined organic phase was washed with 20 ml of brine and dried over MgSO$_4$. The solvent was removed under vacuum, and the crude product was purified by column chromatography using toluene as an eluent to get the product (4.268 g, 93%). δ$_H$ (CDCl$_3$) 1.82 (2H, m), 1.96 (2H, m), 2.46 (1H, t, J=2.4 Hz), 3.38 (2H, t, J=7.7 Hz), 3.60 (2H, t, J=6.4 Hz), 4.17 (2H, d, J=2.4 Hz), 7.87-8.32 (9H, m); δ$_C$ (CDCl$_3$) 28.46, 29.66, 33.33, 58.19, 70.05, 74.31, 80.12, 123.55, 124.75, 124.87, 124.91, 125.12, 125.16, 125.86, 126.64, 127.27, 127.61, 136.81; HRMS (DART) m/z: [M+H]$^+$ calcd for C$_{23}$H$_{20}$O, 313.1587. found, 313.1571.

Example 2

As shown in FIG. 2A, 6-deoxy-6-azido cellulose acetate (CA-N$_3$) was synthesized using cellulose acetate (CA) with an acetyl content of 31.9 wt % (DS$_{Ac}$~1.74) as a starting material. CA was soluble in DMSO and DMF, and 51% of the primary hydroxyl groups at the C6 position (estimated from $^{13}$C NMR spectrum) can be utilized for further functionalization while keeping acetate functional groups. Typically azidation is carried out via two step reaction: bromination or tosylation of hydroxyl groups and then azidation using sodium azide. Here, a one-pot azidation reaction was carried out to produce 6-deoxy-6-azido cellulose acetate (CA-N$_3$) with 92% yield by modifying the procedure described in J. Shey, K. M. Holtman, R. Y. Wong, K. S. Gregorski, A. P. Klamczynski, W. J. Orts, G. M. Glenn, S. H. Imam, Carbohydr. Polym. 2006, 65, 529-534. Cellulose acetate (2 g, 8.13 mmol) was premixed with excess sodium azide (NaN$_3$, 5.285 g, 81.3 mmol) in 50 ml of DMF at room temperature for 1 h. In some cases, heating to 100° C. helped to dissolve cellulose acetate in DMF more quickly faster. Triphenylphosphine (PPh$_3$, 4.265 g, 16.26 mmol) was added to the solution at 0° C., and carbon tetrabromide (CBr$_4$, 5.393 g, 16.26 mmol) in 10 ml of DMF was then added dropwise to the solution. The mixture was allowed to warm to room temperature and stirred for 24 h. The degree of substitution of azide was calculated to be 0.41 from elemental analysis. The polymer was precipitated in 700 ml of methanol while stirring. The filtered polymer was further washed with 500 ml of methanol and dried under vacuum at 40° C. for 4 h. CA-N$_3$ was soluble in acetone, THF, DMF, and DMSO. M$_n$: 68 KDa, M$_w$: 123 KDa, PDI: 1.81; Elemental analysis: C45.87, H4.86, N6.94.

Example 3

Pyrene-functionalized cellulose acetate (Py-CA) was synthesized, as shown in FIG. 2A. 6-Deoxy-6-azide cellulose acetate (0.1 g, ~0.435 mmol) was dissolved in 10 ml of DMSO, and CuSO$_4$.H$_2$O (12.4 mg, 11 mol %) in 0.5 ml of distilled water and sodium ascorbate (26.4 mg, 29 mol %) in 0.5 ml of distilled water were added to the solution. Propargyl pyrenebutyl ether (0.136 g, 0.435 mmol) in 3 ml of DMSO was added, and the solution was heated to 70° C. while stirring for 24 h under dark. The polymer was substantially completely precipitated in 200 ml of methanol while stirring for about 2 h. The filtered polymer was further washed with 100 ml of H$_2$O and 100 ml of methanol and dried under vacuum at room temperature. The degree of substitution of pyrene selector (DS$_{Py}$) was 0.46 from elemental analysis, and Py-CA was soluble in DMSO and THF. M$_n$: 65 KDa, M$_w$: 138 KDa, PDI: 2.13; Elemental analysis: C, 59.36; H, 5.11; N, 4.82; Cu, 0.63.

Example 4

Benzoate-functionalized CA (Benz-CA) was synthesized according to the method described in Example 3, except that the following reagents were utilized: CuSO$_4$.H$_2$O (6 mol %), sodium ascorbate (14 mol %), and propargyl benzoate (3 equiv). (FIG. 2A) The degree of substitution of benzoate selector (DS$_{Benz}$) was 0.42 from elemental analysis, and Benz-CA was soluble in DMSO and THF. M$_n$: 58 KDa, M$_w$: 166 KDa, PDI: 2.85; Elemental analysis: C, 50.37; H, 4.72; N, 5.69; Cu, 1.35.

Example 5

As shown in FIG. 2B, 2,3,4,5,6-Pentafluorophenylacetyl Chloride (F5Ph-Cl) was synthesized by following the method described in E. S. Meadows, S. L. D. Wall, L. J. Barbour, G. W. Gokel, J. Am. Chem. Soc. 2001, 123, 3092-3107. To a solution of 2,3,4,5,6-pentafluorophenylacetic acid (2 g, 8.84 mmol) in 100 ml of CH$_2$Cl$_2$ in an ice bath was added dropwise oxalyl chloride (1.122 g, 8.84 mmol). Anhydrous DMF (catalytic amount) was then added. The solution was allowed to warm to room temperature during 2 h, and CH$_2$Cl$_2$ was removed under vacuum.

Example 6

Phenylacetyl chloride (Ph-Cl) was prepared using the procedure described in Example 5.

Example 7

The following example describes the synthesis of 2,3,4,5,6-pentafluorophenyl-acetyl-Functionalized Cellulose Acetate (F5Ph-CA). (FIG. 2B) F5Ph-Cl (1.780 g, 7.317 mmol) was added dropwise to a solution of CA (0.9 g, 3.658 mmol) in 20 ml of DMF at 60° C. Triethylamine (0.74 g, 7.317 mmol) was then added as a catalyst, and the mixture was stirred for 4 h at 60° C. The polymer was precipitated in 400 ml of methanol. The filtered product was further washed with 200 ml of methanol and dried under vacuum. The degree of substitution of F5Ph receptor (DS$_{F5ph}$) was 0.8 from elemental analysis, and F5Ph-CA was soluble in acetone, THF, DMSO, and DMF. M$_n$: 85 KDa, M$_w$: 150 KDa, PDI: 1.77; Elemental analysis: C, 47.46; H, 2.62; N, 0.28; F, 18.98.

Example 8

Phenylacetyl-functionalized cellulose acetate (Ph-CA) was prepared by the same procedure for F5Ph-CA as described in Example 7. The degree of substitution (DS$_{Ph}$) was calculated to be 0.59 from elemental analysis. Ph-CA was soluble in acetone, THF, DMSO, and DMF. M$_n$: 58 KDa, M$_w$: 102 KDa, PDI: 1.76; Elemental analysis: C, 55.97; H, 5.17; N, 0.26.

Example 9

Quartz crystal microbalance (QCM) experiments were performed using Q-sense E1 to test the ability of functionalized cellulose acetates to absorb target analytes by monitoring the frequency change when they were exposed to analyte vapors. The functionalized cellulose acetates were dropcast onto a gold coated AT-cut quartz crystal sensor with 5 MHz fundamental resonance frequency. 20 μg of each material from the solution of 2 mg/ml was deposited on a QCM sensor. Acetone was used as a solvent for F5Ph-CA and Ph-CA, and THF was used for Py-CA and Benz-CA. The films on QCM sensors were tested towards 500 ppm of benzene (0.47% of the saturated vapor) and toluene (1.3% of the saturated vapor) vapors which were generated from a gas generator (FlexStream™ FlexBase Module, KIN-TEK Laboratories, Inc., TX, United States) with dry nitrogen carrier gas. The concentration of vapor was calibrated by measuring mass change of an analyte after purging nitrogen gas through the analyte as a function of time at a fixed flow rate and temperature. The frequency change (the $3^{rd}$ overtone, $f_3$) of a film on a QCM sensor was measured by three cycles of exposure of a film to an analyte vapor for 1 min. The mass change ($\Delta m$) was converted from the frequency change ($\Delta f$) using the Sauerbrey equation:

$$\Delta m = -C \frac{1}{n} \Delta f$$

where n is the overtone and C is the mass sensitivity (C=17.7 ngcm$^{-2}$s$^{-1}$).

Mass uptake of the functionalized cellulose acetate film upon exposure to the target vapor was measured by monitoring the frequency change of the film dropcast onto a gold-coated 5 MHz QCM sensor. The films were tested towards 500 ppm of benzene (0.47% of the saturated vapor) and toluene (1.3% of the saturated vapor) generated from a gas generator with dry nitrogen carrier gas. The frequencies (the $3^{rd}$ overtone, $f_3$) of the four functionalized cellulose acetate films including F5Ph-CA, Ph-CA, Py-CA, and Benz-CA decreased upon exposure to both benzene and toluene vapors due to the absorbed vapor molecules on the films. (FIG. 5) The responses were reversible in all cases.

The measured frequency change ($\Delta f$) was converted to the mass density change ($\Delta m$) using Sauerbrey's equation. The absorbed amount (mmol) of an analyte per 1 mole of functional groups was then calculated from $\Delta m$ and degrees of substitution of functional groups and was summarized in FIGS. 4B and 4D. From the QCM results, the F5Ph-CA film showed superior absorbing ability towards benzene and toluene vapors, compared to the other films. The response of the F5Ph-CA to benzene vapor of 500 ppm was more than two times higher than those of the other films. The binding abilities of the four functionalized cellulose acetates to toluene vapor had similar trends to those in response to benzene vapor. Direct comparison of the mass uptakes between the F5Ph-CA (5.576 mmol of absorbed benzene per 1 mole of F5Ph selectors) and Ph-CA (1.937 mmol of absorbed benzene per 1 mole of Ph selectors) films showed that the F5Ph selectors with positive electrostatic potential had stronger interactions with benzene and toluene possessing negative quadrupole moments below and above the aromatic ring. The two products containing triazine rings, Benz-CA and Py-CA, showed less absorption efficiency towards benzene and toluene vapors.

What is claimed:

1. A filter material, comprising:
a fiber or network of fibers comprising a cellulose-based polymer comprising at least one binding site, the binding site comprising an aromatic group, wherein the cellulose-based polymer comprises the structure:

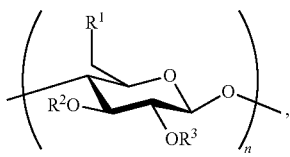

wherein:

$R^1$ has a structure selected from the group consisting of:

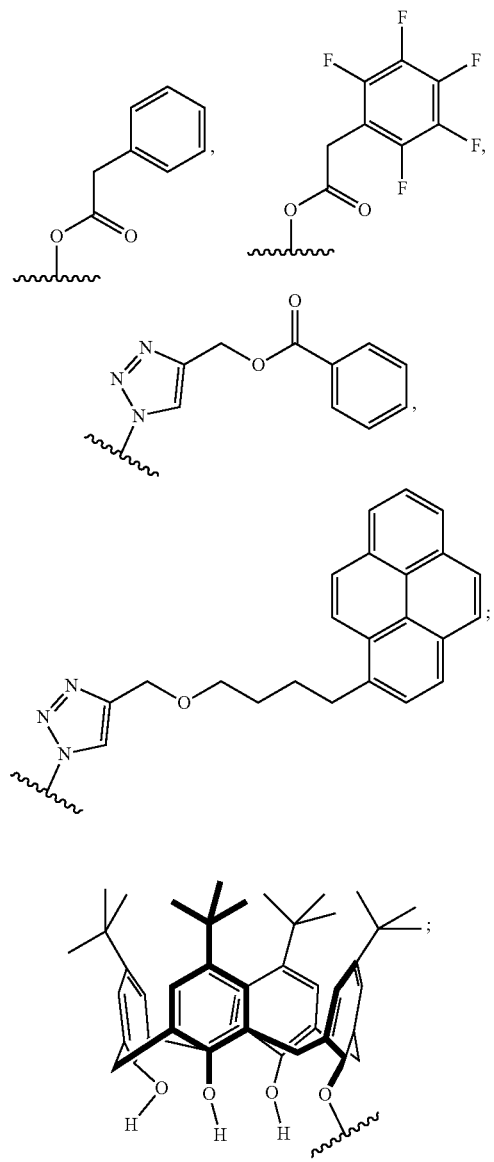

$R^2$ and $R^3$ can be the same or different and are hydrogen, alkyl, aryl, a carbonyl group, any of which is optionally substituted; and n is greater than 1.

2. A filter material as in claim 1, wherein the cellulose-based polymer is substituted cellulose, substituted cellulose acetate, substituted cellulose diacetate, or substituted cellulose triacetate.

3. A filter material as in claim 1, wherein the binding site is capable of binding an aromatic species.

4. A filter material as in claim 1, wherein $R^2$ and $R^3$ can be the same or different and are hydrogen, —COCH$^3$, or —F$^5$Ph.

* * * * *